US012604231B2

(12) United States Patent
Girish et al.

(10) Patent No.:  US 12,604,231 B2
(45) Date of Patent:  *Apr. 14, 2026

(54) ADAPTIVE MULTICAST DATA RATE CONFIGURATION IN MANAGED WI-FI NETWORKS TO IMPROVE THROUGHPUT USING UNSUPERVISED MACHINE LEARNING

(71) Applicant: Fortinet, Inc., Sunnyvale, CA (US)

(72) Inventors: Deepti Girish, Bangalore (IN);
Lavanya Lingaraju Srinivas,
Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,165

(22) Filed: Jun. 26, 2024

(65) Prior Publication Data

US 2024/0430734 A1  Dec. 26, 2024

Related U.S. Application Data

(63) Continuation of application No. 17/957,447, filed on Sep. 30, 2022.

(51) Int. Cl.
*H04W 28/02* (2009.01)
*H04L 1/00* (2006.01)
(52) U.S. Cl.
CPC ....... *H04W 28/0231* (2013.01); *H04L 1/0003* (2013.01); *H04W 28/0268* (2013.01)
(58) Field of Classification Search
CPC ......... H04W 28/0231; H04W 28/0268; H04W 68/00; H04W 4/06; H04L 1/0003; H04L 1/0009; H04L 2001/0093; H04L 45/08; H04L 12/1845; H04L 49/505
See application file for complete search history.

(56) References Cited

U.S. PATENT DOCUMENTS

| | | | |
|---|---|---|---|
| 9,338,073 B2 | 5/2016 | Bhanage et al. | |
| 2008/0049703 A1* | 2/2008 | Kneckt | ................. H04W 68/00 |
| | | | 370/342 |
| 2011/0096712 A1* | 4/2011 | Kish | ....................... H04L 45/16 |
| | | | 370/312 |
| 2011/0211517 A1* | 9/2011 | Moscibroda | .......... H04L 1/0015 |
| | | | 370/312 |
| 2012/0314595 A1* | 12/2012 | Oikawa | ..................... H04L 1/18 |
| | | | 370/252 |
| 2015/0381314 A1 | 12/2015 | Tomisawa | |
| 2016/0057647 A1* | 2/2016 | Sullivan | ................ H04L 1/0016 |
| | | | 370/253 |
| 2022/0321422 A1* | 10/2022 | Jupudi | ................. H04L 41/0677 |
| 2022/0400086 A1* | 12/2022 | Nandy | .................. H04L 47/805 |
| 2023/0361910 A1* | 11/2023 | Wu | .......................... H04W 4/70 |
| 2024/0373194 A1 | 11/2024 | Kozin et al. | |

* cited by examiner

*Primary Examiner* — Hassan A Phillips
*Assistant Examiner* — Muhammad Ainul Huda
(74) *Attorney, Agent, or Firm* — Law Office of Dorian Cartwright; Dorian Cartwright

(57) ABSTRACT

A baseline multicast traffic is derived for an SSID from the network traffic statistics using unsupervised machine learning. Responsive to detecting a deterioration in the real-time network traffic statistics for the SSID in relation to the baseline throughput and the baseline multicast traffic, the multicast data rate can be adjusted to match the lowest unicast data rate for the SSID.

13 Claims, 5 Drawing Sheets

100

Figure 2:
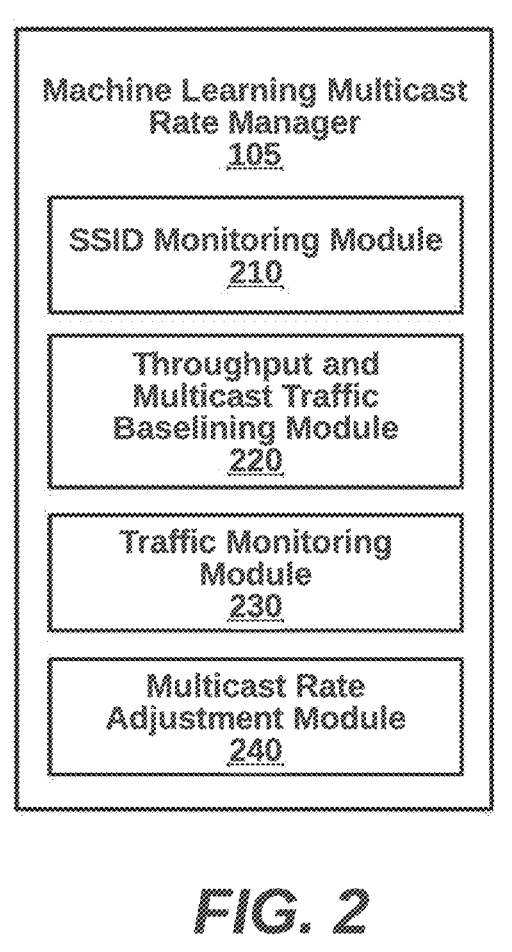

Machine Learning Multicast
Rate Manager
105

SSID Monitoring Module
210

Throughput and
Multicast Traffic
Baselining Module
220

Traffic Monitoring
Module
230

Multicast Rate
Adjustment Module
240

START

COLLECT REAL-TIME NETWORK TRAFFIC
STATISTICS ASSOCIATED WITH SSID AS A
WHOLE AND EACH STATION
310

DERIVE BASELINE THROUGHPUT AND
BASELINE MULTICAST TRAFFIC FOR THE
SSID FROM NETWORK STATISTICS USING
UNSUPERVISED MACHINE LEARNING
320

ADJUST MULTICAST DATA RATE BASED ON
CHANGING NETWORK CONDITIONS
330 (See detail in FIG. 4)

END

<u>600</u>

ADAPTIVE MULTICAST DATA RATE CONFIGURATION IN MANAGED WI-FI NETWORKS TO IMPROVE THROUGHPUT USING UNSUPERVISED MACHINE LEARNING

RELATED APPLICATIONS

This application is a continuation of U.S. application Ser. No. 17/957,447, filed on Sep. 30, 2022, which is incorporated herein by reference in its entirety.

FIELD OF THE INVENTION

The invention relates generally to machine learning and computer networking, and more specifically, for using machine learning to dynamically adjust multicast data rates for service set identifier (SSID) connections based on real-time network statistics for an enterprise network.

BACKGROUND

In a Wi-Fi network, multicast data is typically sent at such a rate that maximizes the chances of successful reception by all the associated clients. This data rate is a basic data rate configured for the SSID and is typically 1, 2, 5.5, 6, or 11 Mbps. In the case of latest standards, it could be a very basic/low MCS index which also translates to poor data rates. Lower data rates are expensive as it increases the airtime used for data transmissions.

In dense deployments and where there are traffic intensive clients, usage of lower data rates can severely increase the airtime utilization and significantly impact even the unicast transmissions, resulting in deterioration of the throughput. Further, IPv6 uses multicast extensively and IP multicast for enterprise video streaming, live lecture broadcasts, etc. is becoming increasingly common. Usage of basic data rates isn't really an ideal configuration in such deployments.

The latest Wi-Fi standards (802.11n and above) support much higher data rates and we could leverage the increased data rates for multicast/broadcast traffic too. In a network with many such clients or even clients from earlier standards but with better data rates, we could achieve efficient airtime utilization and increased throughput if we used an optimal data rate for multicast transmissions than just a basic data rate.

One approach to deal with the problem would be to use multicast to unicast conversions and send the multicast traffic to only the interested clients at the same rate as the unicast traffic, but this approach will suffer if there are too many clients in the multicast group and also in case of broadcast traffic.

What is needed is a robust technique for using machine learning to dynamically adjust multicast data rates for SSID connections based on real-time network statistics for an enterprise network.

SUMMARY

To meet the above-described needs, methods, computer program products, and systems for using machine learning to dynamically adjust multicast data rates for SSID connections based on real-time network statistics for an enterprise network.

In one embodiment, an SSID is monitored, with an exchange of data packets over the enterprise network between network devices, to collect real-time network traffic statistics associated with the SSID as a whole and each station utilizing the SSID. A baseline multicast traffic is derived for the SSID from the network traffic statistics using unsupervised machine learning. Generally, unsupervised machine learning analyzes and clusters unlabeled datasets. For example, K-means clustering can provide a baseline and be updated with new data points as the network conditions change.

In another embodiment, responsive to detecting a deterioration in the real-time network traffic statistics for the SSID in relation to the baseline throughput and the baseline multicast traffic, the multicast data rate can be adjusted to match the lowest unicast data rate for the SSID.

Advantageously, network performance is improved with faster multicast rates and better performance. In turn, network devices will operate better with optimal conditions for network throughput.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a machine learning multicast rate manager of the system of FIG. 1, according to one embodiment.

DETAILED DESCRIPTION

Methods, computer program products, and systems for using machine learning to dynamically adjust multicast data rates for SSID connections based on real-time network statistics for an enterprise network. One of ordinary skill in the art will recognize many alternative embodiments that are not explicitly listed based on the following disclosure.

I. Systems for Dynamic Multicast Rate Adjustment (FIGS. 1-2)

Figure 1:
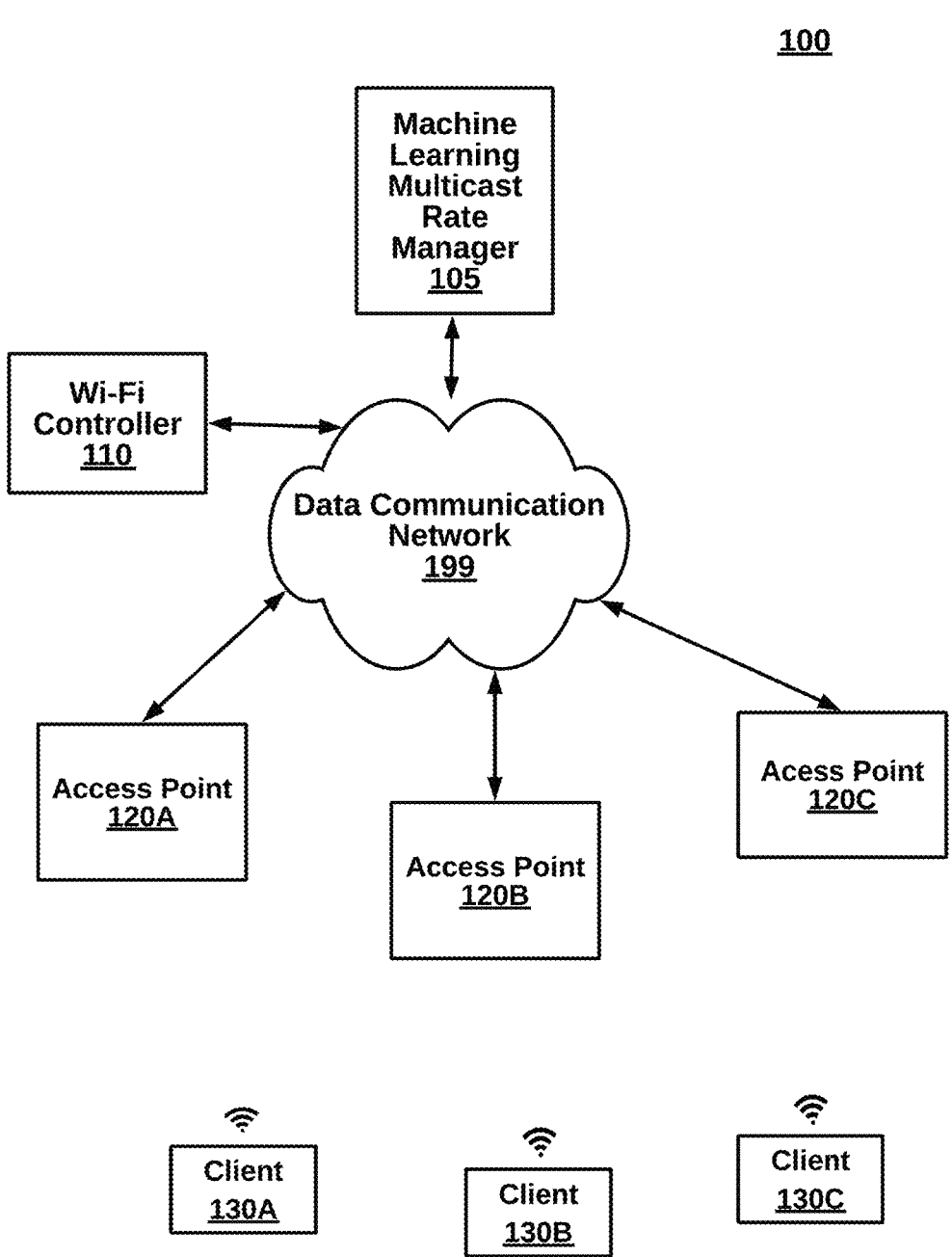
FIG. 1 is a high-level block diagram illustrating a system for using machine learning to dynamically adjust multicast data rates for SSID connections based on real-time network statistics for an enterprise network, according to one embodiment.
Figure 3:
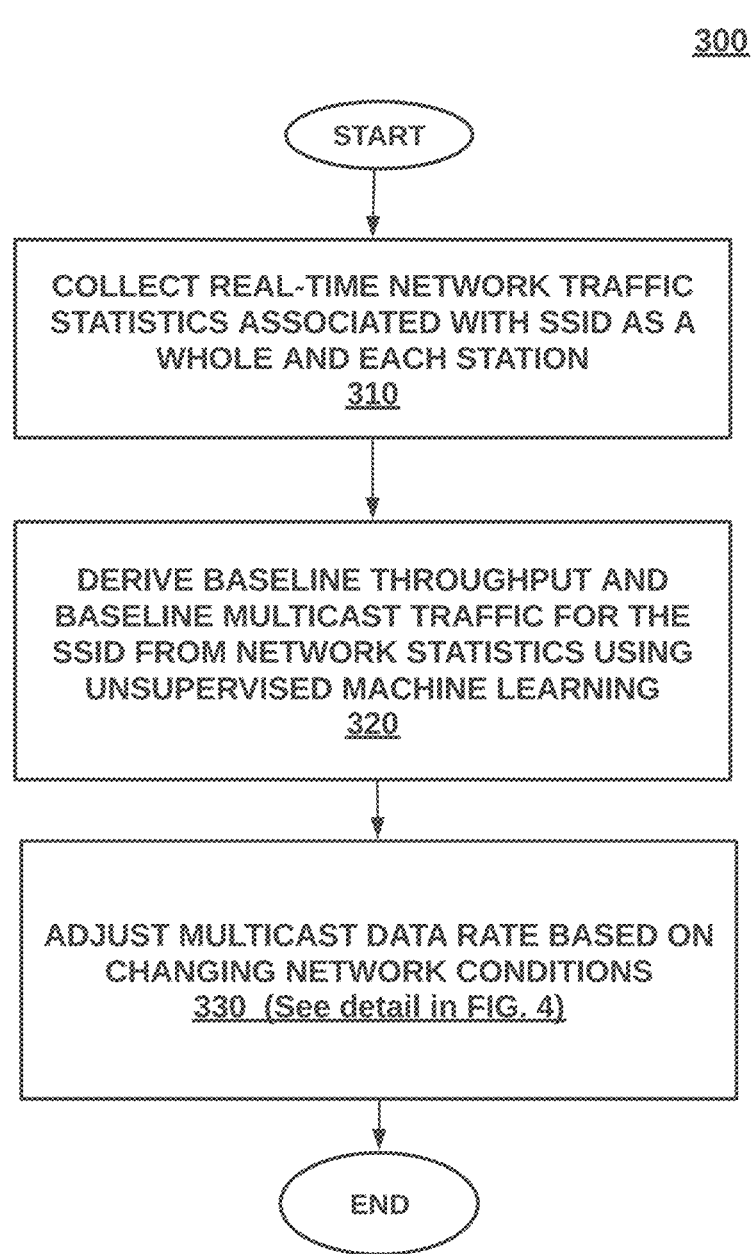
FIG. 3 is a high-level flow diagram illustrating multicast rate optimization, according to an embodiment.

FIG. 1 is a high-level block diagram illustrating a system 100 for using machine learning to dynamically adjust multicast data rates for SSID connections based on real-time network statistics for an enterprise network, according to one embodiment. The system 100 includes a machine learning multicast rate manager 105, a Wi-Fi controller 110, a group of access point 120A-C, and stations 130A-C, coupled in communication with a data communication network 199. Other embodiments of the system 100 can include additional network components that are not shown in FIG. 1. For example, there can be more access points (authorized and unauthorized) and more stations. There can also be network devices such as switches, routers, firewalls, proxy servers, and the like. FIG. 3 is a high-level block diagram illustrating the system 100 of FIG. 1 analyzing data packets for multiple data packets.

The components of the system 100 are coupled in communication over the data communication network. The components can be connected to the data communication system via hard wire (e.g., the multicast rate manager 105, the Wi-Fi controller 110 and the group of access points 120A-C). The components can also be connected via wireless networking (e.g., the stations 130A-C). The data communication network 199 can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802, 11r, and the like. Components can use IPv4 or IPv6 address spaces.

The multicast rate manager 105 selects a multicast rate based on current conditions of the enterprise network. A default base rate or current base rate is adjusted when changes occur to current SSID connections or when new SSID connections are added. For example, deterioration in the overall throughput triggers an analysis to find a better multicast rate having a maximum stability. Typical data rates for SSIDs are 2, 3, 5.5, 6 or 11 Mbps. Changing compositions of the network itself or exterior conditions affecting the network lead to different rates working better for the network at that particular time.

The multicast rate manager 105 can be an independent network device on an enterprise network or on the cloud operating as a service, in one case, that offloads multicast rate management. In another case, the multicast rate manager 105 can be incorporated into the existing infrastructure, such as a network gateway, or the Wi-Fi controller 110. An additional case implements the multicast rate manager 105 within an AIOps device adapted to leverage artificial intelligence and machine learning models to eliminate manual analysis and correlate data from every network edge in automating anomaly detection. Additional embodiments of the multicast rate manager 105 are set forth below in association with FIG. 2.

The group of access points 120A-C are composed of individual access points managed by the Wi-Fi controller 110. The access points 120A-C can use multicast, unicast, broadcast or other means to wireless transmit data packets to the stations 130A-C.

The access points 120A-C can be any of the computing devices, such as a personal computer, a server blade, any computing environment as shown in FIG. 6. The access points 120A-C are preferably connected to the network (or to a switch, router, hub, or another access point that is connected to the network 199) via a wired or wireless connection. The access points 120A-C can be set-up in various configurations with other access points to provide wireless coverage areas. In one embodiment, the functionality is incorporated into a switch or router, and in another embodiment, is incorporated into a custom enclosure. In operation, the access points 120A-C transmit network packets to and from stations.

The stations 130A-C use access points to for access to the wired backbone and to other devices on a Wi-Fi network. When mobile, the stations 130A-C can connect with access point 120A and then later connect with access point 120B, without interruption of services. The stations 130A-C can be implemented as, for example, a mobile station, STA, client or wireless device, a personal computer, laptop, tablet computer, smart phone, mobile computing device, Internet access applications, end station or any other computing device as described in FIG. 6. The stations 130A-C are wirelessly couples to access points using a radio and antenna. No pre-configuration or client is needed. The stations 130A-C can operate according to wireless standards such as IEEE 802.11a, b, g, n, ac, w or any other wireless standard.

FIG. 2 is a more detailed block diagram illustrating the multicast rate manager 110 of the system of FIG. 1, according to one embodiment. The multiuser packet identifier 105 includes an SSID monitoring module 210, a multicast traffic baselining module 220, a traffic monitoring module 230, and a multicast rate adjustment module 240. The components can be implemented in hardware, software, or a combination of both.

The SSID monitoring module 210 to track an SSID, with an exchange of data packets over the enterprise network between network devices, to collect real-time network traffic statistics associated with the SSID as a whole and each station utilizing the SSID.

The throughput and multicast traffic baselining module 220 derives a baseline throughput and a baseline multicast traffic for the SSID from the network traffic statistics using unsupervised machine learning.

The traffic monitoring module 230 can detect a deterioration in the real-time network traffic statistics for the SSID in relation to the baseline throughput and the baseline multicast traffic. For example, MCS index and MCS score for actual data rate can be tracked. One implementation of the traffic monitoring module 230 is external to the machine learning multicast rate manager 105, as other mechanisms of the network also rely upon traffic monitoring. A notification received from an external device can also trigger the multicast rate manager 105 to make rate adjustments.

The multicast rate adjustment module 240, responsive to the deterioration detection, determines if a lowest unicast data rate is higher than a current multicast data rate for the SSID. Responsive to the lowest unicast data rate being higher than the current multicast data rate for the SSID, the multicast data rate to match the lowest unicast data rate for the SSID.

Figure 4:
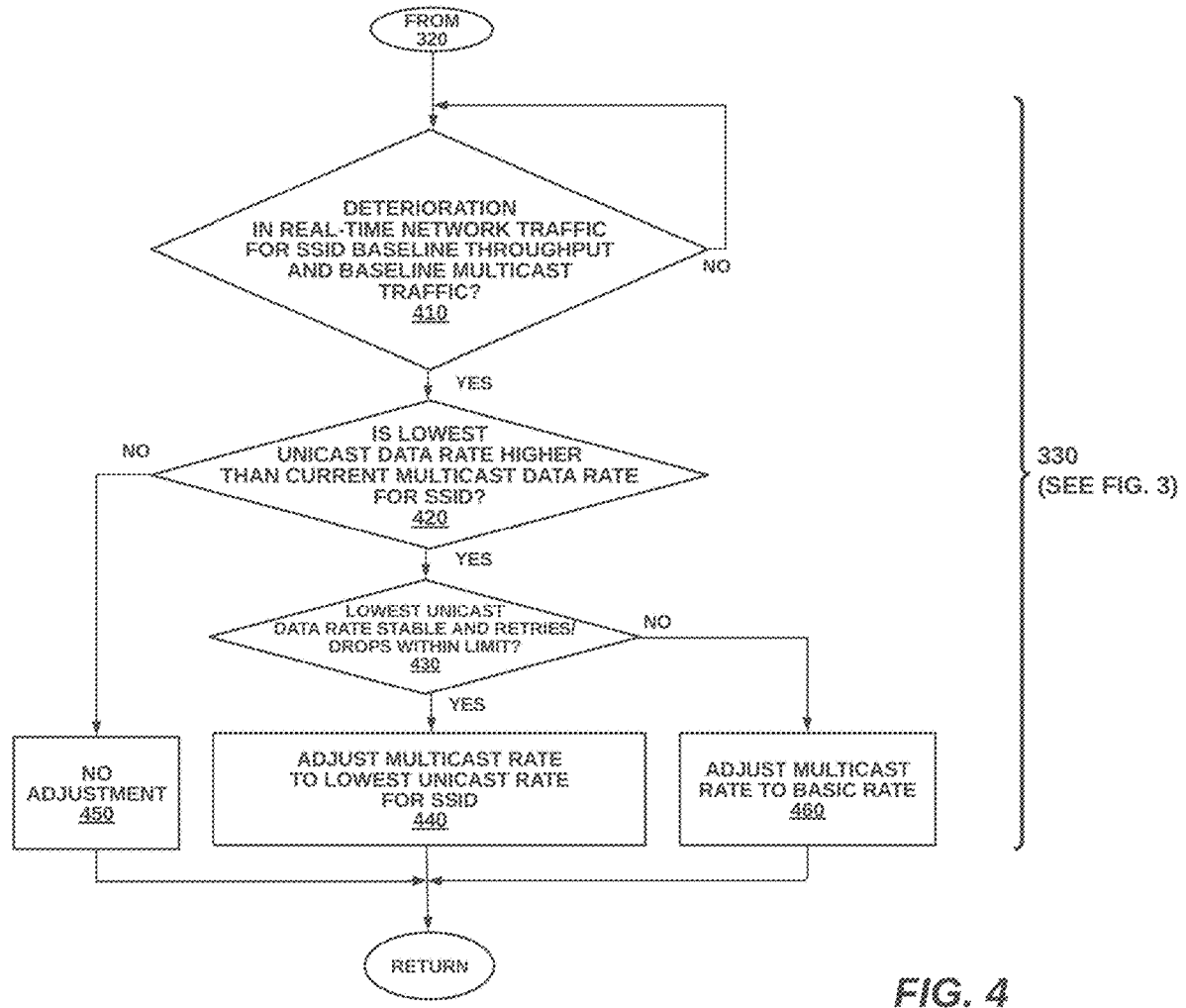
FIG. 4 is a more detailed flow diagram illustrating a step of for using machine learning to dynamically adjust multicast data rates for SSID connections based on real-time network statistics for an enterprise network, according to one embodiment.

II. Methods for Dynamic Multicast Rate Adjustment (FIGS. 3-4)

FIG. 3 is a high-level flow diagram illustrating multicast rate optimization, according to an embodiment. The method 300 can be implemented by, for example, the machine learning multicast rate manager 105 of FIG. 1.

At step 310 an SSID, with an exchange of data packets over the enterprise network between network devices, is monitored to collect real-time network traffic statistics associated with the SSID as a whole and each station utilizing the SSID.

At step 320, a baseline throughput and a baseline multicast traffic for the SSID from the network traffic statistics using unsupervised machine learning.

Figure 5:
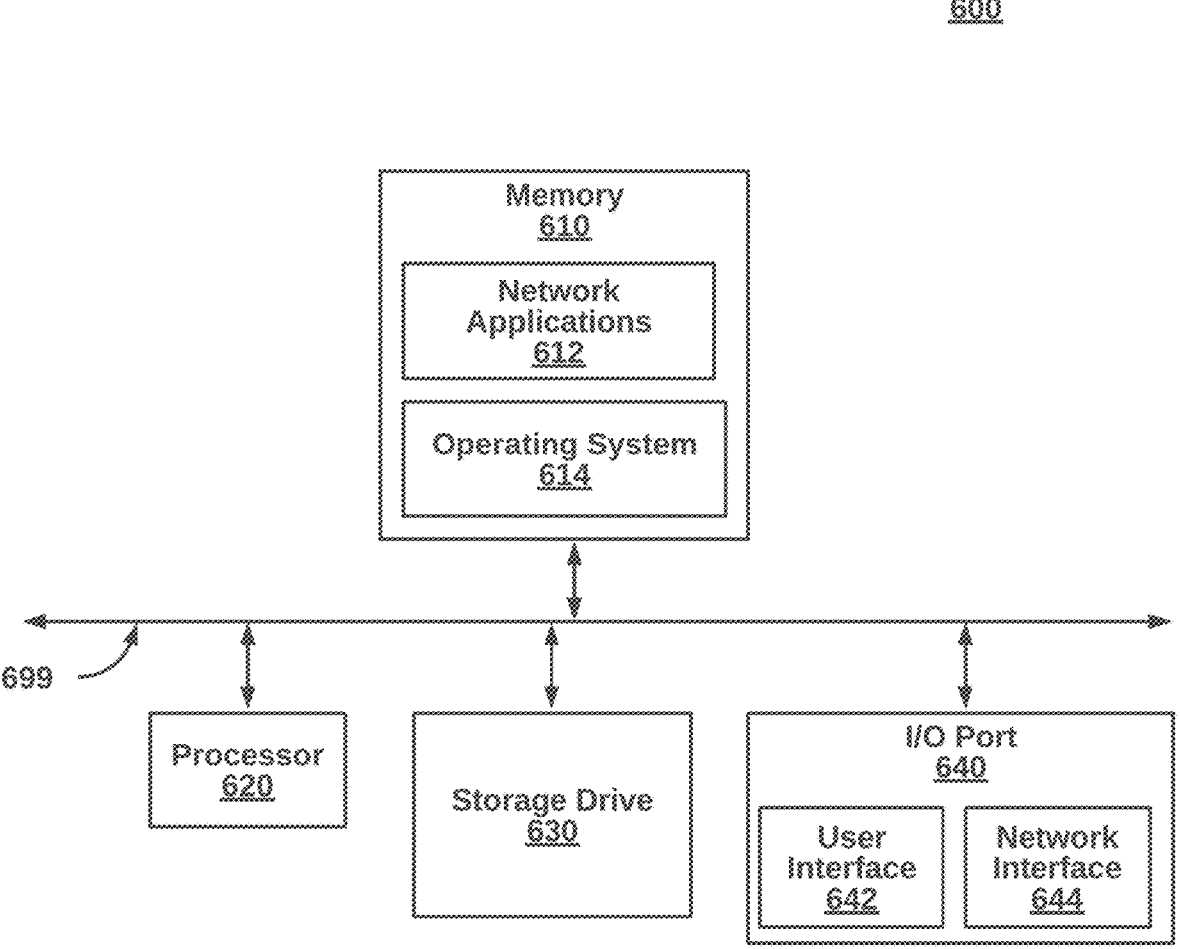
FIG. 5 is a block diagram illustrating an exemplary computing device for the system of FIG. 1, according to one embodiment.

At step 330, the multicast date rate in real-time is adjusted, to maintain optimal throughput, based on changing network conditions, as described more fully with respect to FIG. 5.

Turning to FIG. 4, a more detailed flow diagram illustrates the step 330 for using machine learning to dynamically adjust multicast data rates for SSID connections based on real-time network statistics for an enterprise network, according to one embodiment.

At step 410, a deterioration in the real-time network traffic statistics for the SSID in relation to the baseline throughput and the baseline multicast traffic is monitored. One embodiment identifies deterioration with an unacceptable increase or total amount of multicast and/or broadcast traffic. If so, at step 420, it is determined if a lowest unicast data rate is higher than a current multicast data rate for the SSID.

At step 430, responsive to the lowest unicast data rate being higher than the current multicast data rate for the SSID, it is determined whether the lowest unicast data rate is stable within tolerance. If so, at step 440, the multicast data rate is adjusted to match the lowest unicast data rate for the SSID. In one embodiment, a beacon rate is maintained without adjustment.

On the other hand, if the lowest unicast rate is not higher than the current multicast data rate, no adjustment is made, at step4. If stability is not acceptable, the multicast data rate reverts to the basic rate (or remains at basic rate). Monitoring continues until automatically or manually ceased.

In another implementation, when a new client associates with the network, it can be determine whether a multicast data rate was changed and is not the basic rate. If it is further determined that the data rate negotiated by the new client is lower than the multicast data rate, it can be reverted to a basic rate.

III. Generic Computing Device (FIG. 5)

FIG. 5 is a block diagram illustrating an exemplary computing device 500 for use in the system 100 of FIG. 1, according to one embodiment. The computing device 500 is an exemplary device that is implementable for each of the components of the system 100, including the machine learning multicast rate manager 105, the Wi-Fi controller 110, the group of access points 120A-C, and the stations 130A-C. Additionally, the computing device 500 is merely an example implementation itself, since the system 100 can also be fully or partially implemented with laptop computers, tablet computers, smart cell phones, Internet access applications, and the like.

The computing device 500, of the present embodiment, includes a memory 510, a processor 520, a hard drive 530, and an I/O port 540. Each of the components is coupled for electronic communication via a bus 550. Communication can be digital and/or analog, and use any suitable protocol.

The memory 510 further comprises network access applications 512 and an operating system 514. Network access applications can include 512 a web browser, a mobile access applications, an access applications that uses networking, a remote access applications executing locally, a network protocol access applications, a network management access applications, a network routing access applications, or the like.

The operating system 514 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 520 can be a network processor (e.g., optimized for IEEE 802.11), a general purpose processor, an access applications-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the hard drive 530.

The storage device 530 can be any non-volatile type of storage such as a magnetic disc, EEPROM, Flash, or the like. The storage device 530 stores code and data for access applications.

The I/O port 540 further comprises a user interface 542 and a network interface 544. The user interface 542 can output to a display device and receive input from, for example, a keyboard. The network interface 544 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a network management device for using machine learning to dynamically adjust multicast data rates for a service set identifier (SSID) SSID connections based on real-time network statistics for an enterprise network, the method comprising:

monitoring an SSID, with an exchange of data packets over the enterprise network between network devices, to collect real-time network traffic statistics associated with the SSID as a whole and each station utilizing the SSID;

deriving, with a processor of the network management device, a baseline throughput and a baseline multicast traffic for the SSID from the network traffic statistics using unsupervised machine learning, wherein deriving comprises training machine learning with K-means clustering of the network statistics to determine modulation and coding scheme (MCS) score;

detecting a deterioration in the real-time network traffic statistics for the SSID in relation to the baseline throughput and the baseline multicast traffic;

responsive to the deterioration detection, determining if a lowest unicast data rate is higher than a current multicast data rate for the SSID; and responsive to the lowest unicast data rate being higher than the current multicast data rate for the SSID, adjusting the multicast data rate to match the lowest unicast data rate for the SSID.

2. The method of claim 1, further comprising determining a modulation and coding scheme (MCS) an MCS index during association of stations to the SSID and using the MCS index for the step of deriving the baseline throughput and the baseline multicast traffic.

3. The method of claim 1, wherein the step of baseline derivation comprises determining the MCS to determine actual data rates of stations.

4. The method of claim 1, wherein the network statistics considered for the the MCS score include data rate, retries and discards.

5. The method of claim 1, wherein the SSID is one of a plural of managed SSIDs, wherein the throughput baseline and the baseline multicast traffic are monitored individually for each SSID.

6. The method of claim 1, wherein the SSID is configured to an access point.

7. The method of claim 1, wherein the SSID is configured to a plurality of access points, wherein the throughput and the baseline multicast traffic are monitored individually for each access point.

8. The method of claim 1, wherein the step of determining if the lowest unicast data rate is higher than the current multicast data rate for the SSID comprises determining if the lowest unicast data rate is stable.

9. The method of claim 1, further comprising:

detecting a new client association; and responsive to the new client association detection, determining whether the multicast data rate changed from a basic rate;

responsive determining change, determining whether a unicast data rate negotiated by the new client is less than the multicast data rate; and responsive to the new client unicast data rate being less than the multicast date rate, reverting the multicast rate to the basic.

10. The method of claim 1, wherein the step of deterioration detection comprises at least one of a drop in throughput and an increase in multicast traffic.

11. The method of claim 1, wherein the access point with at least one transceiver in packet capture mode includes at least one transceiver in standard mode.

12. A non-transitory computer-readable medium storing instructions that, when executed by a processor, perform a computer-implemented method for using machine learning to dynamically adjust multicast data rates for service set identifier (SSID) SSID connections based on real-time network statistics for an enterprise network, the method comprising:

monitoring an SSID, with an exchange of data packets over the enterprise network between network devices, to collect real-time network traffic statistics associated with the SSID as a whole and each station utilizing the SSID;

deriving, with a processor of the network management device, a baseline throughput and a baseline multicast traffic for the SSID from the network traffic statistics using unsupervised machine learning, wherein deriving comprises training machine learning with K-means clustering of the network statistics to determine modulation and coding scheme (MCS) score;

detecting a deterioration in the real-time network traffic statistics for the SSID in relation to the baseline throughput and the baseline multicast traffic;

responsive to the deterioration detection, determining if a lowest unicast data rate is higher than a current multicast data rate for the SSID; and responsive to the lowest unicast data rate being higher than the current multicast data rate for the SSID, adjusting the multicast data rate to match the lowest unicast data rate for the SSID.

13. A network device to use machine learning to dynamically adjust multicast data rates for service set identifier (SSID) SSID connections based on real-time network statistics for an enterprise network, the network device comprising:

a processor;

a network interface communicatively coupled to the processor and to the hybrid wireless network; and a memory, communicatively coupled to the processor and storing:

an SSID monitoring module to track an SSID, with an exchange of data packets over the enterprise network between network devices, to collect real-time network traffic statistics associated with the SSID as a whole and each station utilizing the SSID;

a baseline throughput module to derive and a baseline multicast traffic for the SSID from the network traffic statistics using unsupervised machine learning, wherein deriving comprises training machine learning with K-means clustering of the network statistics to determine modulation and coding scheme (MCS) score;

a deterioration module to detect in the real-time network traffic statistics for the SSID in relation to the baseline throughput and the baseline multicast traffic;

a multicast rate adjustment module to, responsive to the deterioration detection, determine if a lowest unicast data rate is higher than a current multicast data rate for the SSID, and responsive to the lowest unicast data rate being higher than the current multicast data rate for the SSID, adjust the multicast data rate to match the lowest unicast data rate for the SSIDs.

* * * * *